United States Patent
Meggiolan

(10) Patent No.: US 9,963,189 B2
(45) Date of Patent: May 8, 2018

(54) CABLE-GUIDE FOR BICYCLE HANDLEBARS AND HANDLEBARS PROVIDED WITH CABLE-GUIDE

(71) Applicant: Campagnolo S.r.l., Vicenza (IT)

(72) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 0 days. days.

(21) Appl. No.: 13/920,851

(22) Filed: Jun. 18, 2013

(65) Prior Publication Data
US 2013/0340564 A1   Dec. 26, 2013

(30) Foreign Application Priority Data

Jun. 18, 2012 (IT) .............................. MI2012A1057

(51) Int. Cl.
*B62K 21/12* (2006.01)
*B62J 99/00* (2009.01)
(Continued)

(52) U.S. Cl.
CPC ............ *B62K 21/12* (2013.01); *B62J 99/00* (2013.01); *B62K 19/16* (2013.01); *B62K 19/30* (2013.01);
(Continued)

(58) Field of Classification Search
CPC ...... Y10T 74/2078; Y10T 74/20792–74/2081; Y10T 74/20822; Y10T 74/20876;
(Continued)

(56) References Cited

U.S. PATENT DOCUMENTS 5,236,212 A * 8/1993 Duehring et al. ......... 280/281.1
6,324,938 B1 * 12/2001 Okouchi ..................... 74/502.6
(Continued)

FOREIGN PATENT DOCUMENTS

CN    2721497 Y    8/2005
DE   29708659 U1   7/1997
(Continued)

OTHER PUBLICATIONS

Italian Search Report and Written Opinion in Italian Application No. IT MI2012001057, dated Nov. 16, 2012 with English translation.
(Continued)

*Primary Examiner* — Richard W Ridley
*Assistant Examiner* — Brian J McGovern
(74) *Attorney, Agent, or Firm* — Volpe and Koenig, P.C.

(57) ABSTRACT

This cable-guide (10) for bicycle handlebars (1), in particular handlebars (1) having a recessed seat (8) for the passage of cables (6, 7) near to a fastening position of controls for the brake and the gearshift (4, 5), comprises a plate (11) for covering the recessed seat (8); the plate (11) is provided with a middle fin (21) projecting from a rear face (13) of the plate (11) intended to face towards the recessed seat (8). The two cables (6,7) are arranged in an optimal manner in the recessed seat (8), without undesired overlapping or movements being able to occur. Therefore, the grip of the hands on that portion of handlebars (1) is more regular and allows the cyclist to keep maximum concentration, without disturbances.

15 Claims, 3 Drawing Sheets

(51) Int. Cl.
*B62K 19/16* (2006.01)
*B62K 19/30* (2006.01)

(52) U.S. Cl.
CPC .. *B62J 2099/0046* (2013.01); *Y10T 74/20822* (2015.01)

(58) Field of Classification Search
CPC .......... Y10T 74/2045; Y10T 74/20462; B62K 19/16; B62K 19/30; B62K 21/12–21/16; B62J 2099/0046; F16L 3/2235; F16L 3/227; F16L 3/23; F16L 3/237; F16L 3/26
USPC .............................. 248/68.1, 65, 67.7, 72, 73
See application file for complete search history.

(56) References Cited

U.S. PATENT DOCUMENTS

| | | | |
|---|---|---|---|
| 2003/0094067 A1 | 5/2003 | Whiting et al. | |
| 2004/0089095 A1 | 5/2004 | Chiang | |
| 2010/0213684 A1* | 8/2010 | D'Aluisio | 280/279 |

FOREIGN PATENT DOCUMENTS

| | | | | |
|---|---|---|---|---|
| GB | 741726 A | 12/1955 | | |
| WO | WO-2008037023 A1 * | 4/2008 | ............. | A01K 97/04 |
| WO | 2010139529 A1 | 12/2010 | | |

OTHER PUBLICATIONS

Japanese Office Action with English translation, for Japanese Application No. 2013-126294, dated Feb. 21, 2017.
Chinese Office Action with English translation, for Chinese Application No. 201310241589.X, dated Feb. 3, 2016.

* cited by examiner

CABLE-GUIDE FOR BICYCLE HANDLEBARS AND HANDLEBARS PROVIDED WITH CABLE-GUIDE

FIELD OF INVENTION

The present invention refers to a cable-guide for bicycle handlebars, in particular handlebars having a recessed seat for the passage of cables near to a fastening position of controls for the brake and the gearshift.

BACKGROUND

Bicycle handlebars generally have a structure with a variously shaped tubular body, at the ends of which two handgrips are provided for the cyclist's hands, near to fastening positions of the controls for the brake and the gearshift. Actually, handgrips often provide more than one grip position for the cyclist's hands, near to the controls for the brake and the gearshift; sometimes, particularly in handlebars intended for racing bicycles, at each end of the handlebars there are many gearshift and/or brake controls, to allow full control of the bicycle with the cyclist keeping his hands in any of the different possible gripping positions.

Bicycle handlebars are known, in particular made from composite material such as carbon fibre, in which there are recessed seats for the passage of cables, formed near to the aforementioned fastening positions. The control cables for the brake and the gearshift, be they steel cables inserted in respective sheaths for mechanical type controls or electric cables for electric type controls, are normally made to pass through these recessed seats so as not to interfere with the cyclist's hands in a possible gripping position of the handlebars, adjacent to the fastening position of the controls. Of course, in order for the recessed seats to actually be useful, it is necessary for the cables passing through them to be held there, otherwise there would again be the situation of possible interference with the cyclist's hands.

Normally, the portions of handlebars intended to be gripped by the cyclist, in all the possible gripping positions, are coated with suitable adhesive tape of relatively soft material and with increased friction, to improve the grip of the hands. This coating can be given the task of holding the cables in the seat. Although in this way it is actually ensured that they are held, the solution is not without drawbacks; indeed, during the application of the cover of adhesive tape it is necessary to hold the cables temporarily, so that at the end they are in the desired position, and this complicates the application of the adhesive tape itself. Moreover, the grip of the cyclist's hands on the area of the seat covered by adhesive tape is disturbed by the pliability of the adhesive tape, below which the cables provide an uncertain and discontinuous support.

To hold the cables in the recessed seats, it is also known to use removable cable-guides, see WO 2010/139529 A1. These small plates are snapped onto the handlebars, and lock the cables in the desired position; the adhesive tape can then be applied above the small plates. The application of the tape is thus easier, and the grip is also improved.

However, there still remains the need to further improve the grip of the cyclist's hands, since these handlebars—as stated—are often intended for racing bicycles, where every tiny detail must be taken care of to ensure that the cyclist has the best conditions.

SUMMARY

Therefore, the present invention concerns, in a first aspect thereof, a cable-guide according to claim 1; preferred characteristics of the cable-guide are given in the dependent claims 2 to 8. In a second aspect thereof, the invention concerns handlebars provided with such a cable-guide.

More specifically, the invention provides a cable-guide for bicycle handlebars, in particular handlebars having a recessed seat for the passage of cables near to a fastening position of controls for the brake and the gearshift, comprising a plate for covering the recessed seat, characterised in that the plate is provided with a middle fin projecting from a rear face of the plate intended to face towards the seat.

Thanks to the middle fin, the two cables are arranged in an optimal manner, regularly arranged in the recessed seat, without undesired overlapping or movement being able to occur. Therefore, the grip of the hands on that portion of handlebars is more regular and allows the cyclist to keep maximum concentration, without disturbances.

Preferably, the middle fin has a height such as to rest on the bottom of the recessed seat, when the cable-guide is mounted. This allows the fin to provide the cable-guide with a solid support, capable of withstanding even very high compression forces on the plate from the cyclist's hands without any risk.

Preferably, the cable-guide comprises an appendix, projecting from an edge of the plate at the middle fin. This appendix, when the cable-guide is fixed onto the recessed seat, is positioned between the two cables; in this way, it fills the space that would otherwise remain free, thus improving the grip of the hands on the handlebars.

Preferably, the middle fin also extends on the appendix. In this way, the correct positioning of the cables is ensured even outside of the plate, in the area near to the appendix. Moreover, the fin below the appendix provides a valid support for the appendix itself on the bottom of the recessed seat and thus ensures a better grip, without the risk of a pressure of the fingers that is too strong being able to break the appendix.

Preferably, the appendix and the fin have corresponding width. By this it is meant that, at the appendix, the fin is evenly joined to the appendix, without steps or discontinuity, and that the fin does not have discontinuity between its portion at the plate and its portion at the appendix. This ensures the better positioning of the cables and therefore an optimal support for the cyclist's hands to grip.

Preferably, the appendix has an arched shape. With this shape, the appendix is able to help the best positioning of the cables, which coming out from the recessed seat tend to follow a curved path, to reach the controls for the brake and the gearshift.

Preferably, the appendix has decreasing width, from the edge of the plate towards an end thereof. The thinning of the appendix going away from the plate allows the cables to gradually come towards one another; this reduces the bulk, without jeopardising the correct positioning, which is still ensured by the presence of the fin.

The plate can theoretically be any shape, even very compact. Preferably, however, the plate has an elongated shape in the direction of the fin, so that an adequate extension of the plate and of the fin is ensured, in order to ensure both the correct positioning of the cables, and a good support for the cable-guide on the bottom of the seat.

Preferably, the fin is provided with weight-reduction grooves, extending longitudinally in the fin. Such grooves allow the weight of the cable-guide to be reduced, without reducing its functionality.

Preferably, the cable-guide comprises holes for fastening to the handlebars, formed at the fin and through it. The holes allow easy and stable attachment to the handlebars through rivets; their positioning through the fin ensures the maximum solidity of the cable-guide, since the fin acts in practice like a strengthener of the plate.

Preferably, a front face of the plate opposite the rear face is provided with a surface finish having increased friction. Although—as stated above—it is commonplace to coat these parts of the handlebars with adhesive tape suitable for providing the best gripping conditions for the cyclist's hands, the provision of a surface with increased friction on the plate can in some cases make it unnecessary to apply adhesive tape. For this purpose, the front face of the plate can be milled, knurled or coated with rubber material.

A cable-guide according to the first aspect of the invention is useful on any handlebars in which there is a recessed seat for the passage of cables. In particular, such a cable-guide is especially useful when the handlebars are made from composite material, typically carbon fibre, due to the high surface slipperiness of this material, which increases the problems of positioning the cables and of gripping by the cyclist.

BRIEF DESCRIPTION OF THE DRAWING(S)

Further characteristics and advantages of the invention will become clearer from the following description of a cable-guide and of handlebars according to the invention, made with reference to the attached drawings. In such drawings.

DETAILED DESCRIPTION OF THE PREFERRED EMBODIMENT(S)

Figure 1:
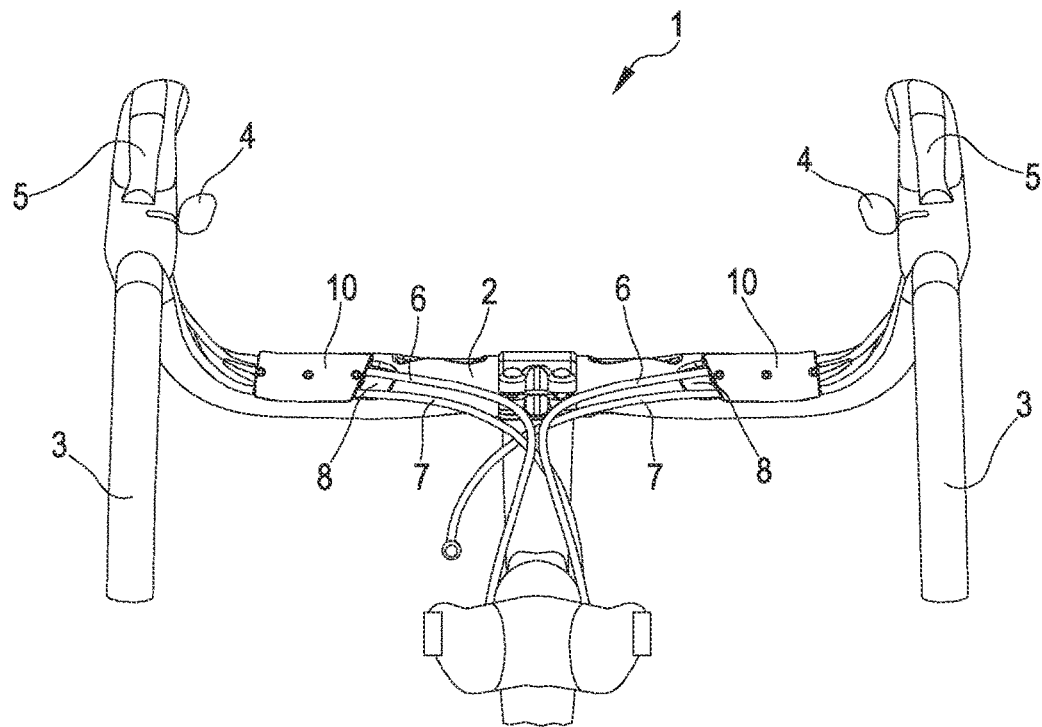
FIG. 1 is a view from below of handlebars according to the invention.
Figure 2:
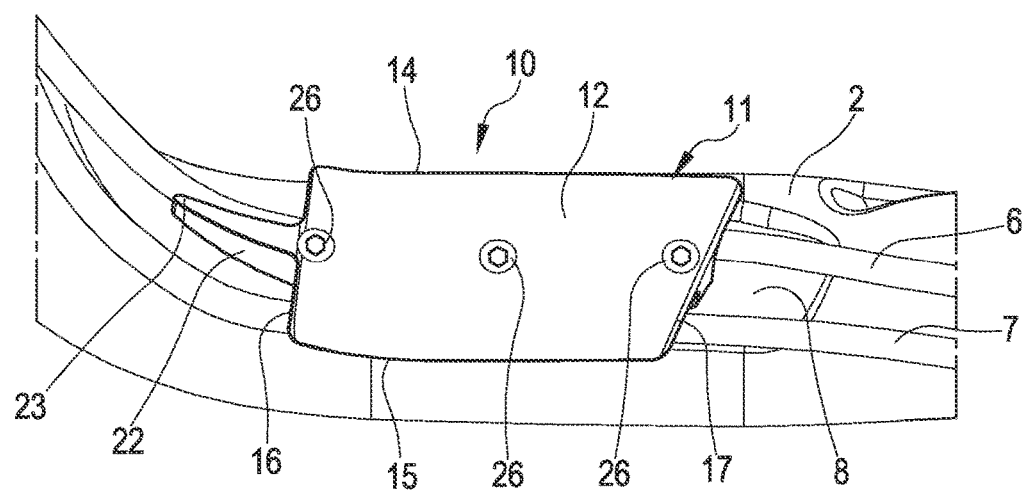
FIG. 2 is an enlargement of a detail of the handlebars of FIG. 1, with a cable-guide according to the invention highlighted.
Figure 3:
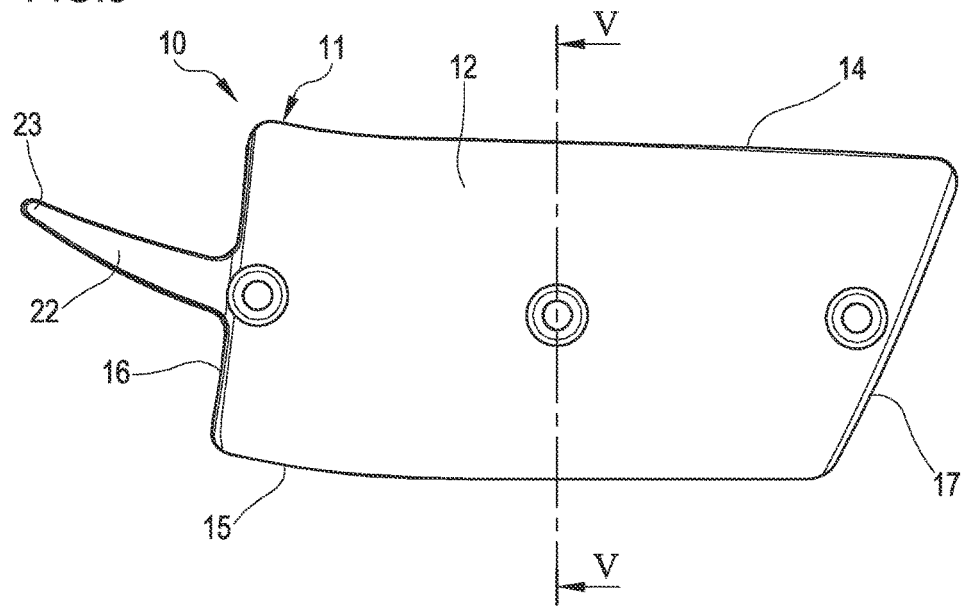
FIG. 3 is a front view of the cable-guide of FIG. 2.
Figure 4:
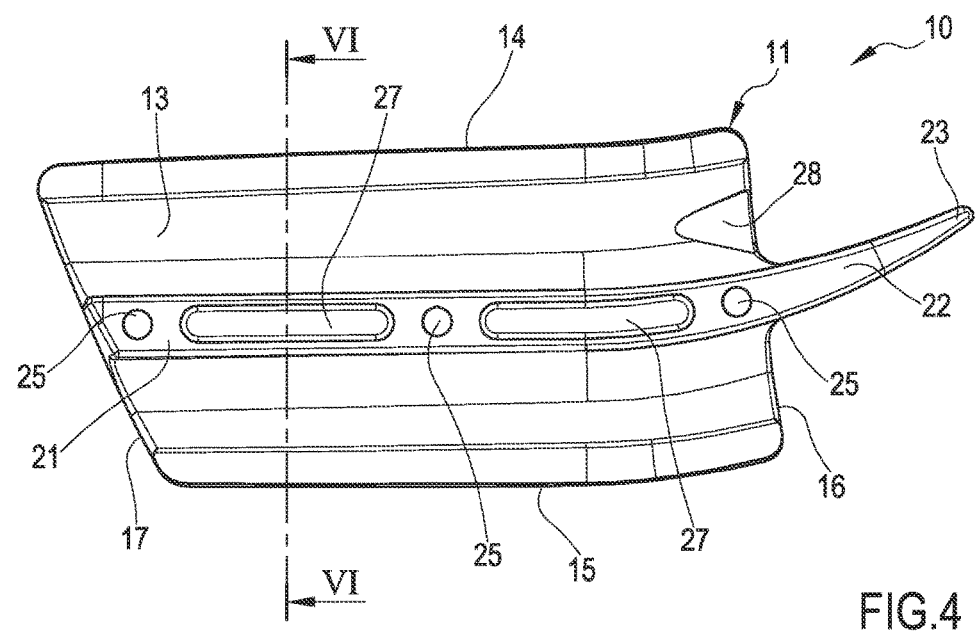
FIG. 4 is a rear view of the cable-guide of FIG. 2.
Figure 5:
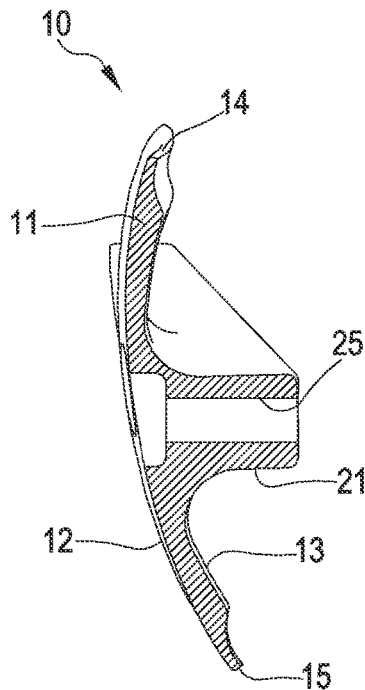
FIG. 5 is a section view of the cable-guide of FIG. 2, according to the line V-V of FIG. 3.
Figure 6:
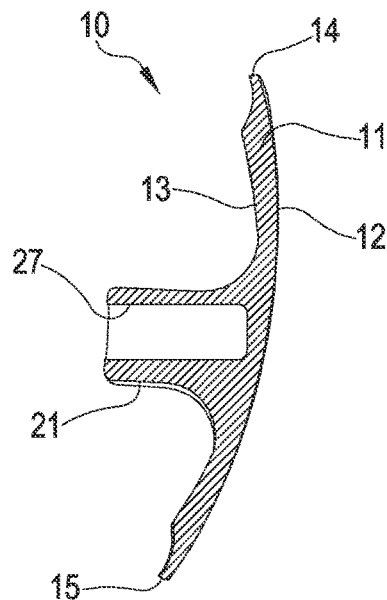
FIG. 6 is a section view of the cable-guide of FIG. 2, according to the line VI-VI of FIG. 4.
Figure 7:
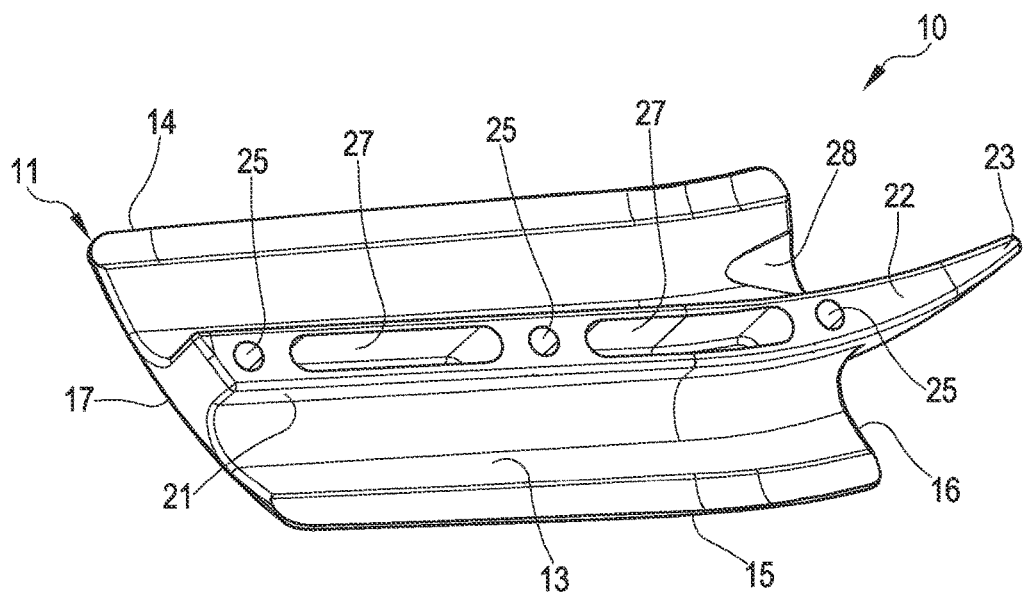
FIG. 7 is a rear perspective view of the cable-guide of FIG. 2.

FIGS. 1 and 2 show handlebars 1 of a racing bicycle, with a tubular body 2 provided at its opposite ends with two handgrips 3, for example of the curved type. The handlebars 1 are preferably made from composite material, for example carbon fibre incorporated in a matrix of polymeric resin. Near to each handgrip 3 there is a gearshift control 4 and a brake control 5. For example, the gearshift control 4 is of the electrical type whereas the brake control 5 is of the mechanical type; therefore, each gearshift control 4 is associated with an electric cable 6 and each brake control 5 is associated with a sheathed cable 7. The cables 6 and 7 start from the respective controls 4 and 5 and extend along the tubular body 2 of the handlebars 1, to then proceed along the bicycle frame up to the members respectively controlled by each control.

The handlebars 1 comprise two recessed seats 8 for the passage of cables, formed in the tubular body 2 near to the fastening positions on the handlebars 1 of the gearshift controls 4 and the brake controls 5.

Each recessed seat 8 is provided with a respective cable-guide 10, made from a suitable polymeric material. FIG. 1 illustrates two cable-guides 10, for the right recessed seat 8 and for the left one (with reference to the direction of travel of the bicycle), respectively, whereas FIGS. 2 to 7 illustrate just the right cable-guide 10 in greater detail; the left cable-guide 10 is indeed symmetrically the same as the right cable-guide 10, and hereafter it will not be described in a specific manner.

The cable-guide 10 comprises a plate 11 for covering the recessed seat 8; therefore, the plate 11 has a flattened shape, curved so as to close the recessed seat 8 by evenly joining to the handlebars 1, and it thus has a front face 12 and a rear face 13, facing towards the recessed seat 8, as well as two longer edges, one upper 14 and one lower 15, and two shorter edges, one right 16 and one left 17 (with reference to the direction of travel of the bicycle on which the handlebars 1 are mounted).

The plate 11 has an elongated shape in the direction of its longer edges 14 and 15 and it is provided with a middle fin 21, projecting from the rear face 13 of the plate 11, in a position that is indeed in the middle with respect to the two longer edges 14 and 15. The middle fin 21 has an extension (going away from the rear face 13 of the plate 11) substantially equal to the depth of the recessed seat 8, so as to rest on the bottom thereof, when the cable-guide 10 is mounted on the handlebars 1.

The cable-guide 10 also comprises an appendix 22, projecting from the right edge 16 of the plate 11, at the middle fin 21. The middle fin 21 also extends over the appendix 22, where it has a width corresponding to it and extension always such as to allow resting on the bottom of the recessed seat 8. The appendix 22 has an arched shape, with convexity facing upwards in the mounting position on the handlebars 1, and is pointed, with decreasing width from the edge 16 of the plate 11 towards an end 23, which is pointed and rounded. The middle fin 21 extends parallel to the upper edge 14 and the lower edge 15 and the middle fin 21 extends substantially between the side edges 16, 17.

At the middle fin 21, in the cable-guide 10 holes 25 are formed, for fastening to the handlebars through rivets 26; in the illustrated example, there are three holes 25. The holes 25 thus pass through both the plate 11 and the middle fin 21, so as to ensure the maximum solidity for the cable-guide 11 and for its attachment to the handlebars 1.

The middle fin 21 is also provided with two weight-reduction grooves 27, extending along the middle fin 21, between the holes 25.

The front face 12 of the plate 11 of the cable-guide 10 preferably has a surface finish having increased friction; this finish (not highlighted in the drawings) can be obtained through coating with a rubber material or through milling or knurling of the material of the plate 11 itself.

The rear face 13 of the plate 11 can be provided with chamfers, at the edges 16 and/or 17, to facilitate the passage of the cables 6 and/or 7; in the illustrated example, a chamfer 28 is provided.

As can be appreciated, particularly with reference to FIG. 2, the cable-guide 10 allows the cables 6 and 7 to be kept locked neatly in the predetermined position inside the recessed seat 8 on the handlebars 1. Moreover, the appendix 22 completes the correct positioning of the cables 6 and 7 even beyond the plate 11, also filling the space between the cables 6 and 7 themselves; in this way, the cyclist's grip on this area of the handlebars 1 is more regular, whether the area is then coated with adhesive tape to help gripping with the hands (as often occurs), or it is left free.

What is claimed is:

1. A cable-guide for bicycle handlebars having a recessed seat for passage of cables, the cable-guide comprising:

a plate having an upper edge and a lower edge of predetermined lengths and side edges having lengths that are less than the predetermined lengths that is configured to cover the recessed seat, wherein the plate has a front face and a rear face, and a middle fin that projects from the rear face into the recessed seat, the middle fin includes an appendix that projects beyond one of the side edges of the plate, and the middle fin extends parallel to the upper edge and the lower edge and contacts both of the side edges;

wherein the middle fin includes through holes for attaching the cable-guide to the bicycle handlebars by a fastener, and oblong weight-reduction grooves positioned between the through holes;

wherein the rear face of the plate includes a chamfer at at least one of the side edges.

2. Bicycle handlebars, comprising a shaped tubular body, the recessed seat for passage of cables formed in the tubular body in a region of a fastening position of controls for a brake and a gearshift and a cable-guide according to claim 1 fixed onto the recessed seat for holding the cables in the recessed seat.

3. Bicycle handlebars comprising a shaped tubular body made from composite material, the recessed seat for passage of cables formed in the tubular body in a region of a fastening position of controls for a brake and a gearshift and a cable-guide according to claim 1 fixed onto the recessed seat for holding the cables in the recessed seat.

4. The cable-guide according to claim 1, wherein the middle fin has a height such that the middle fin rests on a bottom portion of the recessed seat, when the cable-guide is mounted.

5. Bicycle handlebars, comprising a shaped tubular body, the recessed seat for passage of cables formed in the tubular body in a region of a fastening position of controls for a brake and a gearshift and a cable-guide according to claim 4 fixed onto the recessed seat for holding the cables in the recessed seat.

6. Bicycle handlebars comprising a shaped tubular body made from composite material, the recessed seat for passage of cables formed in the tubular body in a region of a fastening position of controls for a brake and a gearshift and a cable-guide according to claim 4 fixed onto the recessed seat for holding the cables in the recessed seat.

7. The cable-guide according to claim 1, wherein the appendix has an arched shape.

8. Bicycle handlebars, comprising a shaped tubular body, the recessed seat for passage of cables formed in the tubular body in a region of a fastening position of controls for a brake and a gearshift and a cable-guide according to claim 7 fixed onto the recessed seat for holding the cables in the recessed seat.

9. The cable-guide according to claim 1, wherein the appendix has a decreasing width, from the one of side edges of the plate towards an end thereof.

10. Bicycle handlebars, comprising a shaped tubular body, the recessed seat for passage of cables formed in the tubular body in a region of a fastening position of controls for a brake and a gearshift and a cable-guide according to claim 9 fixed onto the recessed seat for holding the cables in the recessed seat.

11. The cable-guide according to claim 1, wherein the front face of the plate opposite the rear face is provided with a surface finish having a friction coating or a patterned surface.

12. Bicycle handlebars, comprising a shaped tubular body, the recessed seat for passage of cables formed in the tubular body in a region of a fastening position of controls for a brake and a gearshift and a cable-guide according to claim 11 fixed onto the recessed seat for holding the cables in the recessed seat.

13. Bicycle handlebars comprising a shaped tubular body made from composite material, the recessed seat for passage of cables formed in the tubular body in a region of a fastening position of controls for a brake and a gearshift and a cable-guide according to claim 11 fixed onto the recessed seat for holding the cables in the recessed seat.

14. The cable-guide according to claim 11, wherein the front face of the plate is milled, knurled or coated with rubber material.

15. Bicycle handlebars, comprising a shaped tubular body, the recessed seat for passage of cables formed in the tubular body in a region of a fastening position of controls for a brake and a gearshift and a cable-guide according to claim 14 fixed onto the recessed seat for holding the cables in the recessed seat.

* * * * *